Patented Oct. 21, 1947

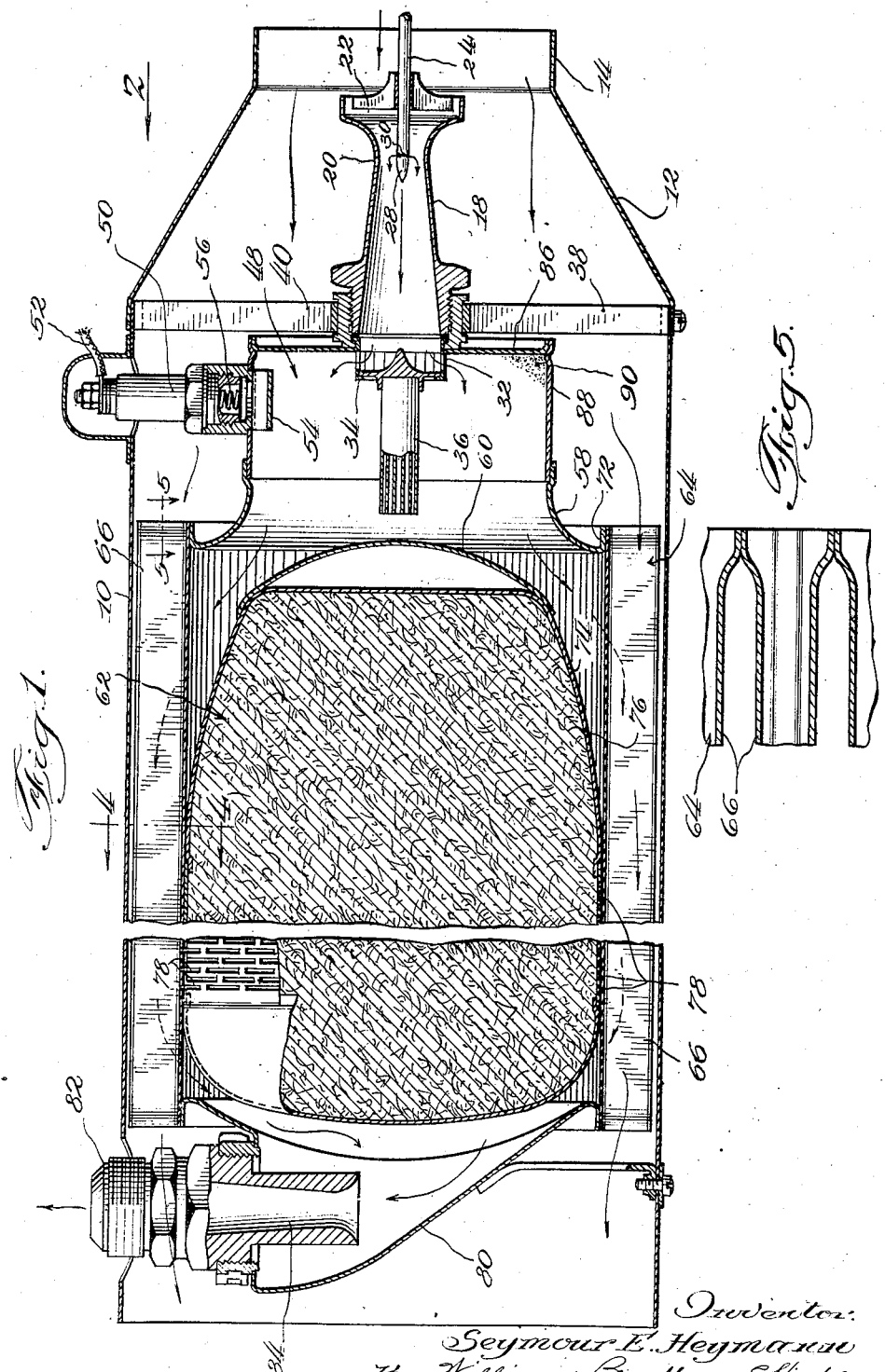

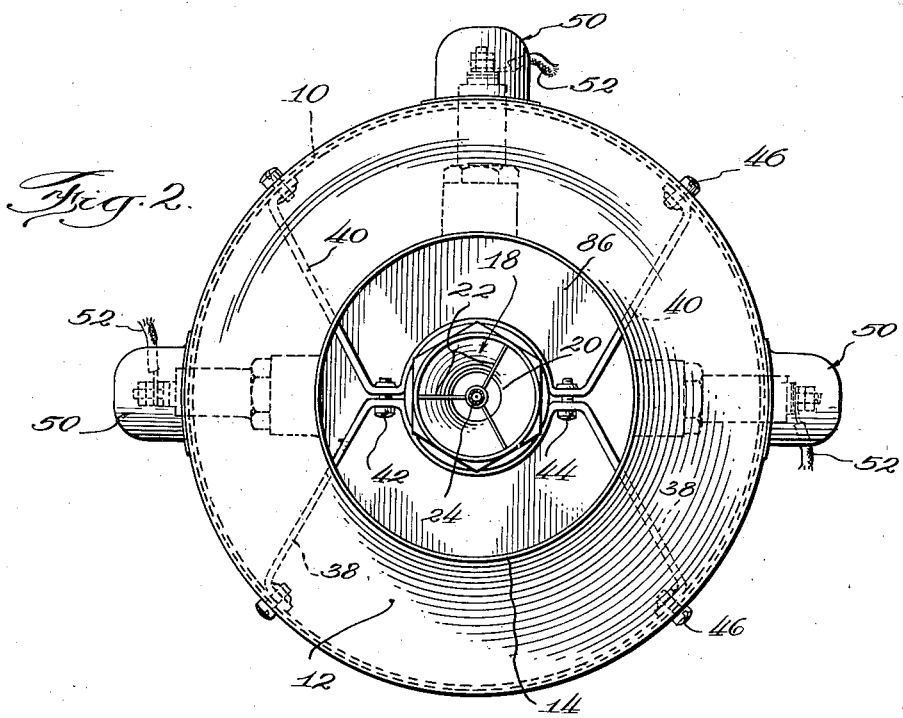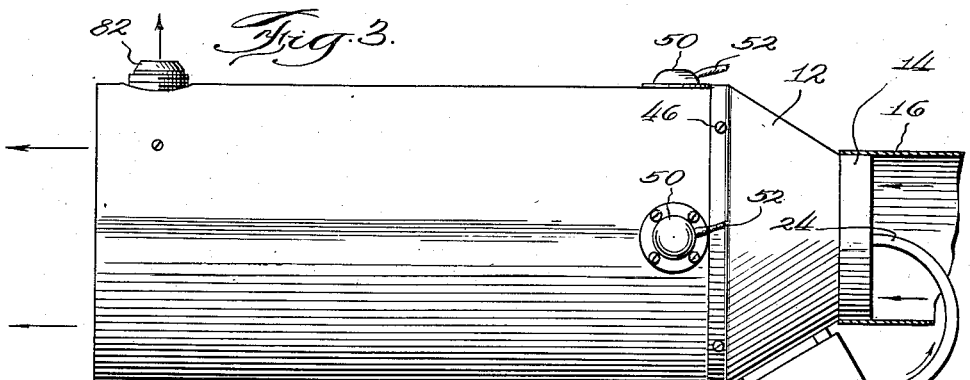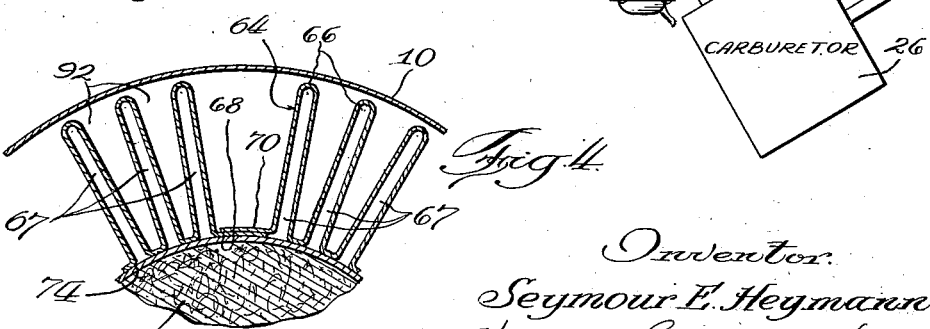

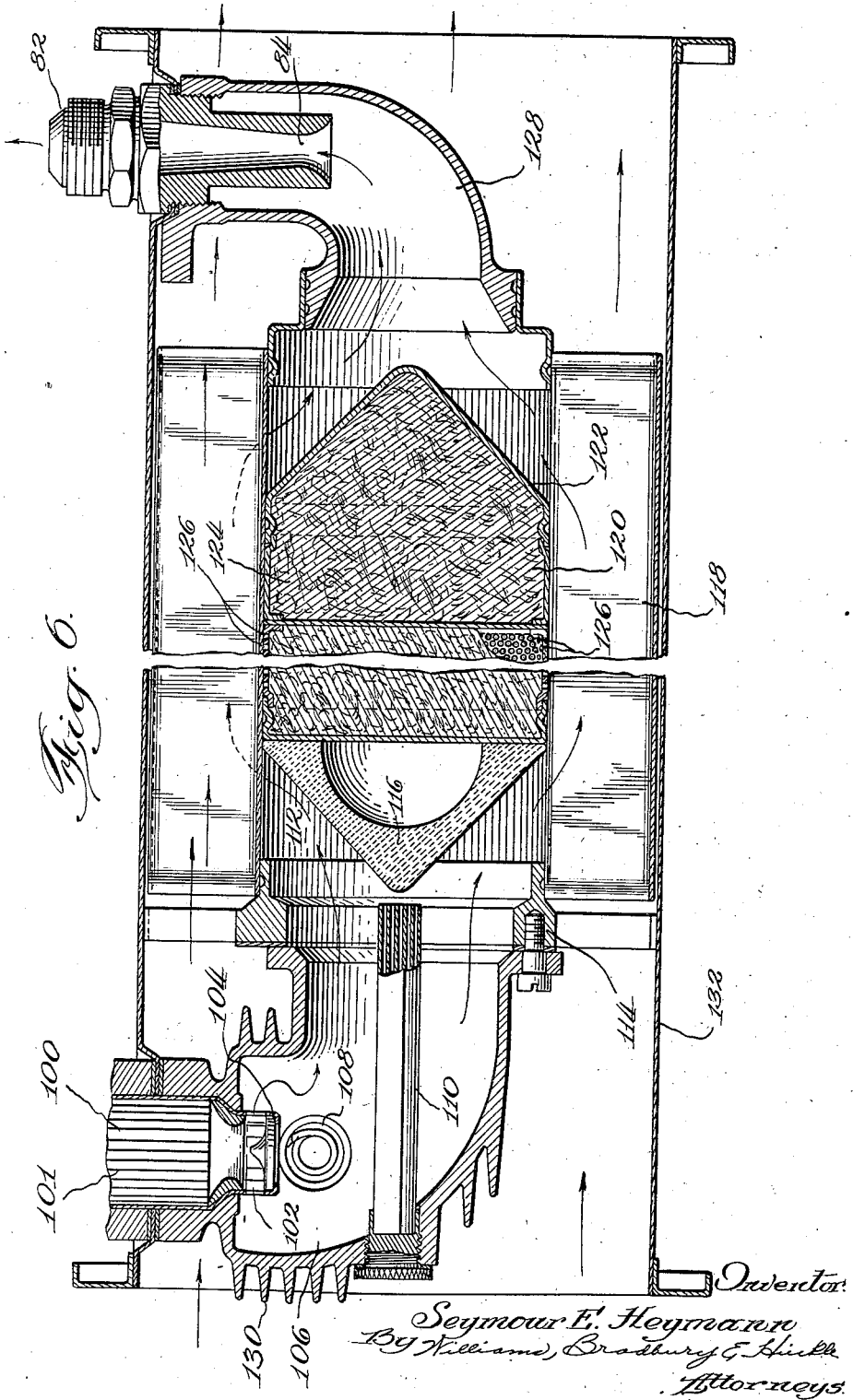

2,429,514

UNITED STATES PATENT OFFICE 2,429,514

LIGHTWEIGHT AIRCRAFT HEATER WITH MUFFLER

Seymour E. Heymann, Chicago, Ill., assignor to Stewart-Warner Corporation, Chicago, Ill., a corporation of Virginia Application August 20, 1942, Serial No. 455,517

3 Claims. (Cl. 126—116)

My invention pertains to aircraft heaters and more particularly to aircraft heaters of the type wherein the heat from burning or burned gases is transmitted to ventilating air for heating a cabin or other enclosure in the aircraft.

An object of my invention is to provide a new and improved aircraft heater which is more efficient than the aircraft heaters now in use.

Another object of my invention is to provide a new and improved aircraft heater which is lighter in weight than the aircraft heaters now in use.

Another object of my invention is to provide an aircraft heater having a new and improved arrangement of fins for transferring heat from the products of combustion to the ventilating air to be heated therefrom.

Another object is to provide an improved efficient heat exchanger, particularly for the transfer of heat from one gaseous medium to another.

Another object of my invention is to provide an aircraft heater having improved heat transfer and silencing means.

Another object of my invention is to provide a new and improved aircraft heater which is simple and economical to manufacture and which can be made of less critical materials than those used in present heaters.

Other objects and advantages will become apparent as the description proceeds.

In the drawings:

Fig. 1 is a longitudinal section through a preferred embodiment of my invention;

Fig. 2 is an elevational view of the righthand end of the heater shown in Fig. 1;

Fig. 3 is a diagrammatic view illustrating one way in which this heater can be connected to sources of air and fuel;

Fig. 4 is a partial, transverse section taken on the line 4—4 of Fig. 1;

Fig. 5 is a section taken on the line 5—5 of Fig. 1 showing details of the fin construction; and Fig. 6 is a longitudinal, sectional view of a modified form of my invention.

The embodiment of Figs. 1 to 5, inclusive, is a heater of the internal combustion type which is especially designed for heating the cabin or other compartments of aircraft but which is capable of other uses. In this embodiment, the heater comprises a shell 10 of sheet metal, such as stainless steel or other suitable material. The shell 10 has a tapered inlet end 12 terminating in an annular flange 14 adapted to be telescoped into or otherwise attached to an air supply pipe 16 deriving its air from a ram, blower, or other suitable source of air under pressure.

Part of the air entering the inlet end of the heater passes into a Venturi tube 18 having a restricted throat 20. A spider 22 is located in the inlet end of the Venturi tube 18 and forms a support for a fuel supply pipe 24 communicating with a carburetor 26, which delivers a rich mixture of fuel and air to the pipe 24. The other end of the pipe 24 is closed, as indicated at 28, and has an annular series of perforations 30 located in the most restricted part of the Venturi tube throat 20 so that air flowing through the Venturi tube will create a maximum suction at the openings 30.

The mixture supplied by the pipe 24 will mix with the air flowing through the Venturi tube 18 and form therewith a combustible mixture which travels the length of the Venturi tube 18 and is discharged with a whirling motion through ports 32 arranged in the circular wall of a burner tube 34. The burner tube 34 forms a support for a re-igniter 36 of any desirable or conventional type and the re-igniter, burner tube, and Venturi tube are supported in straps 38 and 40, which are bolted together, as indicated at 42 and 44. The straps 38 and 40 are attached to the shell 10 by any suitable means, such as screws 46.

The combustible mixture, which is discharged with a whirling motion through ports 32 in burner tube 34, passes into a combustion chamber 48 wherein the combustible mixture is initially ignited by igniters 50, of which three are utilized in the particular embodiment shown in the drawing. It is to be understood, however, that the number of igniters used may be varied to suit different conditions of operation and any desired number or arrangement of these igniters may be utilized. The igniters 50 are the hot wire type and are connected to a battery or other suitable source of electrical energy by wires 52. The igniters 50 are provided with semi-circular shields 54 which prevent the combustible mixture discharged through the ports 32 from striking directly against the resistance elements 56 and thereby protect these resistance elements from being cooled below the ignition point by the relatively cold combustible mixture.

The combustible mixture initially admitted to the burner 48 is ignited by the igniters 50 and then passes between the outwardly curved collar 58 and the cap 60 of muffler 62 to the heat transfer means. This means is preferably formed from a single, thin sheet 64 of stainless steel or other suitable material which is corrugated by dies to form the hollow projecting fins 66 shown in Fig. 4. The corrugated sheet 64 is then bent into the form of a cylinder and the overlapping edges 68 and 70 are welded together, as indicated in Fig. 4, so that the hollow fins 66 form longitudinally extending projections on the exterior of a generally cylindrical structure.

The ends of the hollow fins 66 are pinched together, as indicated in Fig. 5, and then welded to form a fluid-tight joint which absolutely seals the ends of these hollow fins. The curved collar 58 has a cylindrical flange 72, which is welded or otherwise suitably attached to one end of the finned sheet 64 so that the hot gases flowing from the combustion chamber 48 may flow lengthwise of the interior of the hollow fins 66 and give up their heat to these fins. The muffler 62 is located in the finned cylinder 64. This muffler comprises a sheet metal shell 74 of stainless steel or other suitable material which is welded to the finned sheet intermediate the fins to form separate passages 67 (Fig. 4) extending lengthwise of the hollow fins. The muffler shell reinforces and stiffens the finned plate 64 and is filled with glass wool 76 or other sound deadening material which is highly resistant to heat. The sheet metal shell 74 is provided with staggered slots 78 running circumferentially of the shell 74 and providing an accoustic coupling with the interior of the muffler shell for the sound waves in the burned gases.

After the burned gases have passed lengthwise of the hollow fins 66 and have given up their heat to these fins, these gases pass into the space between the rear end of the muffler 62 and an end plate 80 communicating with a discharge pipe 82 leading to atmosphere. The outlet end of the pipe may be either arranged so that the movement of the aircraft tends to create a suction in this pipe or so that the pressure in this pipe is not affected by movement of the aircraft. The inlet end of this exhaust pipe 82 is preferably provided with a Venturi-like restriction 84 which serves to minimize the effects of pressure variations in the exhaust pipe on the pressure existing in the hollow fins 66 and combustion chamber 48.

It will be noted that the cap 60 and adjacent end of the muffler 62 are tapered and that the inlet passageway between these parts and the curved collar 58 widens out as it approaches the finned plate 64. This inlet passage extends a considerable distance from the inlet ends of the fins 66 in order to prevent concentration of the flow of heated gases against the inlet ends of these fins. Such a concentration of heated gases against the inlet ends of the fins would cause these fins to get excessively hot, but by spreading the gases flowing from the combustion chamber along an appreciable length of the fins, no part of the fins will become excessively hot.

The combustion chamber 48 has a vertical end wall 86 which forms a right angle where it joins the cylindrical wall 88. The right angled corner formed at the junction of these walls forms a space containing a moving ring of relatively slow burning gases indicated at 90 and this ring of slow burning gases functions as a re-igniter after the igniters 50 have been switched off by the usual thermostatic or other controls. However, I do not rely completely upon this ring of burning gases to function as a re-igniting means and I, therefore, provide a conventional re-igniter 36.

That part of the air supplied by pipe 16 and not passing into the Venturi tube 18 is hereinafter referred to as the ventilating air and is passed over the exterior of the fins 66 to receive heat therefrom. This ventilating air flows between the Venturi tube 18 and the tapered portion 12 of the shell and thence flows between the combustion chamber 48 and the cylindrical portion of the shell 10. This air is then directed into the spaces 92 (Fig. 4) between the hollow fins 66 and flows lengthwise of these spaces until it reaches the outlet end of the shell 10. This heated ventilating air may then pass directly into the cabin or other compartment of the aircraft or may be conveyed through suitable ducts to heat a plurality of compartments or to discharge into the same compartment at different points thereof.

The stainless steel fins 64 are preferably made of as thin material as is capable of standing up under service conditions. The burned gases flow lengthwise of the hollow fins and the air to be heated flows lengthwise of the spaces 92 between these fins. The thin material forming the walls of the fins is in direct contact with the two streams of fluids and the heat to be transferred need only pass directly through the thin wall of a fin in order to be transferred from the burned gases to the ventilating air. The length of the metal conducting path for the heat is thus much shorter in my novel heater than in the conventional heater where the heat to be transferred must be conducted considerable distances through the material of which the solid fins are made. The fins 66 may, therefore, if necessary, be made of material having relatively poor heat conductivity as compared to the material used in prior art constructions. Furthermore, the use of the hollow fins provides an extremely light construction which is very considerably lighter than the conventional solid fin structure of equal heat transfer capacity.

As the burned gases flow lengthwise of the hollow fins, they pass between the walls of these fins and the wall of the muffler 62. The slots 78 provide openings through which sound waves in these gases may readily pass into and be absorbed by the glass wool 76. In passing lengthwise of the hollow fins 66, the burned gases are traveling crosswise of the narrow elongated slots 78 which are arranged in staggered rows extending circumferentially of the muffler 62 and this arrangement has been found to be particularly efficacious.

In Fig. 6 I have illustrated a modified form of my invention wherein a combustible mixture of fuel and air is supplied to inlet 100 from a carburetor, supercharger, or any other suitable source of supply. The inlet is preferably provided with flame arresting tubes 101. The combustible mixture is discharged with a whirling motion through slots 102 in a burner tube 104 and passes into a combustion chamber 106 where it is ignited by one or more igniters 108, which may be of any conventional type. A re-igniter 110 is provided to maintain combustion of the gases after the igniter 108 has been cut out by the usual thermostatic or manual switch.

From the combustion chamber the burned gases flow through the passageway 112 formed between an annular fitting 114 and a hollow ceramic cone 116 and hence into the hollow fins provided by the annular finned structure 118, which may be identical with that described in connection with the previous embodiment. A muffler 120 is located within the finned structure 118 and comprises a sheet metal shell 122 of stainless steel, or other suitable material. This shell 122 is filled with glass wool 124, or other suitable sound deadening and heat resisting material. The shell 122 is provided with perforations 126 permitting sound waves contained in the burned gases to have free access to the interior of the muffler.

After the burned gases have traversed the length of the hollow fins, these gases flow into an outlet 128, which may be connected to an exhaust pipe communicating directly with atmosphere. In some installations the outlet end of the exhaust pipe may be so arranged that movement of the aircraft tends to create a suction therein and in other installations the same result can be accomplished by connecting the outlet 128 to an exhaust blower.

Air to be heated is supplied to the lefthand end of the heater, as viewed in Fig. 6, by a blower, ram, or other suitable means. This air first contacts the solid fins 130 about the combustion chamber and absorbs some heat therefrom. The air then passes into the space provided between the heater shell 132 and the finned structure 118 and flows lengthwise of the passageways formed between adjacent fins and acquires heat therefrom. The heated air is then discharged from the righthand end of the casing 132 either directly into the cabin or other space to be heated or into ducts which serve to distribute the heated ventilating air in any desired manner.

The heater shown in Fig. 6 is illustrated as being of the internal combustion type wherein a combustible mixture is supplied to a combustion chamber and is there ignited. In some installations, however, it may be preferable to connect the inlet 100 with the exhaust pipe of an internal combustion engine and when this is done the flame arresting tubes 101, burner tube 104, igniter 108, and re-igniter 110 may be omitted. The muffler may also be omitted whenever the additional back pressure caused thereby would result in an undesired decrease in the efficiency of the engine. The exhaust gases admitted through the inlet 100 flow through the finned structure 118 and give up their heat to the ventilating air just as do the combustible gases which are burned in the combustion chamber 106 when this heater is supplied with a combustible mixture instead of exhaust gases. This heater may be so connected that it will operate either on a combustible mixture or exhaust gases from an internal combustion engine or similar device. For such an installation the tubes 101, burner tube 104, igniter 108 and re-igniter 110 would be retained, but these parts would perform no essential function while the heater was operating on exhaust gases. An additional inlet would be provided for the exhaust gases.

The embodiment shown in Fig. 1 can also be used with exhaust gases by eliminating combustion chamber 48, igniters 50, Venturi tube 18, burner tube 34, reigniter 36, and straps 38 and 40. The exhaust pipe could then be connected directly to the inlet end of flaring collar 58. The tapered inlet end 12 of the shell would also be eliminated and the ventilating air admitted directly to the righthand end of cylindrical shell 40 from a blower, ram, or other suitable source. An alternative arrangement would be to eliminate only the Venturi tube 18, burner tube 34, reigniter 36, and igniters 50, and to connect the exhaust pipe directly to the opening in the wall 86 of combustion chamber 48. The holes formed in the periphery of the combustion chamber by the removal of igniters 50 would, of course, be closed by suitable plugs.

A feature of my invention lies in the fact that the hot gases which transverse the heater are deflected outwardly as they approach and enter the heat transfer means. These gases are also deflected radially inward as they leave the heat transfer means. Such changes in direction bring the gases into more intimate contact with the heat transfer means and prevent stratification of the gases with relatively cold layers of gases in contact with the heat transfer surfaces. Such changes in direction of the heated gases, therefore, increases the efficiency of the apparatus.

While I have illustrated my novel heat transfer means as embodied in a heater through which burning or burned gases are passed and over which ventilating air to be heated is likewise passed, my novel heat transfer means is not limited to this use. This heat transfer means is particularly efficient in that the wall of an extremely thin plate having integral hollow fins constitutes the only metallic path for the heat which is transferred from one fluid to another and this thin wall serves to separate the two fluids. This novel heat transfer means is capable of general application and may be used to transfer heat from a gas to a liquid, or from a liquid to a gas, or from one liquid to another.

While I have illustrated and described in detail only two embodiments of my invention, both embodiments disclose a heater wherein the heat to be transferred is conducted through a metallic path of minimum length whereby a heater of maximum efficiency is produced. Both heaters also require a minimum of weight for a given output. These heaters are compact and easy to manufacture by conventional methods and are ideally suited for aircraft, although capable of use for other purposes.

Numerous modifications and variations may be made in the structures illustrated without departing from my invention. The scope of my invention is defined by the following claims.

I claim:

1. In a heater of the class described, a tubular structure having hollow fins extending lengthwise and open laterally toward the axis thereof, a muffler located in said tubular structure and engaging said fins to form passageways lengthwise of the interior of said fins, said muffler comprising a shell having a multiplicity of small openings connecting the interior of the shell with the interior of the fins, sound deadening means in said muffler shell, said structure having a gas inlet end and a gas outlet end, said muffler shell being tapered and trending away from the fins adjacent said inlet end whereby gases entering said end first come in contact with the interior of said hollow fins throughout an appreciable length thereof, means forming a combustion chamber, means for admitting hot gases from said combustion chamber to the passageways lengthwise of the interior of said fins, and means whereby the exterior of said fins is exposed to relatively cool gas.

2. In a heater of the class described, the combination of means forming a combustion chamber, means for admitting a combustible mixture thereto, a tubular structure having longitudinally extending hollow fins, means forming a flared passage connecting said combustion chamber with the interior of said fins, a muffler located in said tubular structure, said muffler comprising a shell containing sound deadening material and having openings connecting the interior of said shell with the interior of said fins, and means for directing air to be heated over the exterior of said fins.

3. In heating apparatus of the class described, the combination of a tubular structure having hollow fins extending longitudinally thereof and opening toward the axis of the structure, a cylindrical muffler located in said structure and cooperating therewith to form relatively small passageways extending lengthwise of the interior of said fins, the wall of said muffler having perforations through which said passageways are connected with the interior of the muffler, said muffler containing vibration absorbing material, means for connecting said passageways with a source of high temperature gas, tapered means disposed axially within the tubular structure for directing said gas laterally into said passageways through the open sides of the fins adjacent one end thereof, and means for utilizing heat transmitted to said fins by said gas.

SEYMOUR E. HEYMANN.

REFERENCES CITED

The following references are of record in the file of this patent:

UNITED STATES PATENTS

| Number | Name | Date |
|---|---|---|
| 1,062,521 | Trotter | May 20, 1913 |
| 2,135,235 | Hurford et al. | Nov. 1, 1938 |
| 1,927,213 | MacKenzie et al. | Sept. 19, 1933 |
| 2,171,002 | Lengyel | Aug. 29, 1939 |
| 1,912,785 | Mills | June 6, 1933 |
| 1,667,133 | Schrader | Apr. 24, 1928 |
| 964,902 | Fall | July 19, 1910 |
| 2,379,017 | McCollum | June 26, 1945 |

FOREIGN PATENTS

| Number | Country | Date |
|---|---|---|
| 726,474 | France | Mar. 7, 1932 |